(12) United States Patent
Baek et al.

(10) Patent No.: US 9,048,477 B2
(45) Date of Patent: Jun. 2, 2015

(54) BATTERY PACK

(71) Applicant: Samsung SDI Co., Ltd., Youngin-si, Gyeonggi-do (KR)

(72) Inventors: Woonseong Baek, Yongin-si (KR); Sangjoo Lee, Yongin-si (KR); Hyungshin Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 129 days.

(21) Appl. No.: 13/859,552

(22) Filed: Apr. 9, 2013

(65) Prior Publication Data

US 2013/0224530 A1    Aug. 29, 2013

Related U.S. Application Data

(63) Continuation-in-part of application No. 12/850,052, filed on Aug. 4, 2010, now Pat. No. 8,445,124.

(30) Foreign Application Priority Data

Sep. 9, 2009   (KR) .................. 10-2009-0084763

(51) Int. Cl.
 *H01M 2/02*   (2006.01)
 *H01M 2/10*   (2006.01)
(52) U.S. Cl.
 CPC .......... *H01M 2/1016* (2013.01); *H01M 2/1022* (2013.01); *H01M 2/1072* (2013.01); *H01M 2/1061* (2013.01); *H01M 2/0267* (2013.01)
(58) Field of Classification Search
 USPC .............. 429/7, 163, 175, 176, 177, 185, 186
 See application file for complete search history.

(56) References Cited

U.S. PATENT DOCUMENTS

| | | | |
|---|---|---|---|
| 6,759,152 B2 | 7/2004 | Iwaizono et al. |
| 7,521,150 B2 | 4/2009 | Seo et al. |
| 7,939,191 B2 | 5/2011 | Kim |
| 8,080,333 B2 | 12/2011 | Akatsuchi et al. |
| 2004/0091769 A1 | 5/2004 | Kawabata et al. |
| 2004/0241541 A1 | 12/2004 | Watanabe et al. |
| 2005/0064286 A1 | 3/2005 | Kozu et al. |
| 2005/0112456 A1 | 5/2005 | Kozu et al. |

(Continued)

FOREIGN PATENT DOCUMENTS

| | | | |
|---|---|---|---|
| JP | 09306440 A | * | 11/1997 |
| KR | 100770097 B1 | | 10/2007 |

(Continued)

OTHER PUBLICATIONS

Korean Notice of Allowance issued by KIPO on Sep. 26, 2011 in connection with Korean Patent Application Serial No. 10-2009-0084763 was cited by Applicants in U.S. Appl. No. 12/850,052.

*Primary Examiner* — Robert B Davis
(74) *Attorney, Agent, or Firm* — Robert E. Bushnell, Esq.

(57) ABSTRACT

A battery pack having increased resistance against external impact by increasing a coupling strength between a bare cell and a case, resulting in increased reliability and quality. The battery pack includes a bare cell, a circuit module electrically connected to the bare cell, a frame case surrounding the bare cell and including a channel groove arranged at a region facing the bare cell, a coupling reinforcement portion arranged in the channel groove to couple the frame case to the bare cell and a metal label attached to side surfaces of the bare cell.

23 Claims, 7 Drawing Sheets

(56) References Cited

U.S. PATENT DOCUMENTS

| | | |
|---|---|---|
| 2005/0175889 A1 | 8/2005 | Han |
| 2005/0221130 A1 | 10/2005 | Yoon |
| 2006/0019160 A1 | 1/2006 | Han |
| 2006/0127756 A1 | 6/2006 | Seo |
| 2007/0154785 A1 | 7/2007 | Seo et al. |
| 2008/0057383 A1 | 3/2008 | Seo et al. |
| 2008/0241654 A1* | 10/2008 | Koh et al. .............. 429/100 |
| 2008/0286644 A1* | 11/2008 | Yeo ........................ 429/122 |
| 2008/0305367 A1* | 12/2008 | Baek et al. .............. 429/7 |
| 2009/0038145 A1 | 2/2009 | Kozu et al. |
| 2009/0081485 A1 | 3/2009 | Heo |
| 2009/0092896 A1 | 4/2009 | Koh et al. |
| 2009/0136837 A1 | 5/2009 | Komoto et al. |
| 2009/0186268 A1 | 7/2009 | Song |
| 2009/0191448 A1 | 7/2009 | Yamamoto et al. |
| 2010/0124674 A1 | 5/2010 | Kwag |
| 2011/0129698 A1 | 6/2011 | Baek |

FOREIGN PATENT DOCUMENTS

| | | |
|---|---|---|
| KR | 100867922 B1 | 11/2008 |
| KR | 1020090027067 A | 3/2009 |
| KR | 100922469 | 10/2009 |

* cited by examiner

BATTERY PACK

CLAIM OF PRIORITY

This application makes reference to, incorporates the same herein, and claims all benefits accruing under 35 U.S.C. §119 from an application earlier filed in the Korean Intellectual Property Office on 9 Sep. 2009 and there duly assigned Serial No. 10-2009-0084763 and claims all benefits accruing under 35 U.S.C. §120 from an application earlier filed in the U.S. Patent and Trademark Office on 4 Aug. 2010 and there duly assigned Ser. No. 12/850,052 (now U.S. Pat. No. 8,445,124 issued May 21, 2013).

BACKGROUND OF THE INVENTION

1. Field of the Invention

The present invention relates to a design for a battery pack that provides better protection against external impact, especially to external impact to the top side of the battery.

2. Description of the Related Art

Lithium secondary batteries can be manufactured in a battery pack configuration, and the battery pack can be configured to include a bare cell, a circuit module, and an external cover. The bare cell can include an electrode assembly, a can for receiving the electrode assembly, and a cap assembly for sealing an upper opening of the can. The electrode assembly can include a positive electrode plate, a negative electrode plate and a separator. The circuit module can include a circuit device such as a charge/discharge device and a protective circuit device and be coupled to the bare cell. The external cover can cover the circuit module.

In general, battery packs can deteriorate in quality because coupling between components loosen due to an external impact. Thus, battery packs with structures having increased resistance against the external impact are needed.

SUMMARY OF THE INVENTION

The present invention provides a battery pack that can improve resistance against an external impact by increasing a coupling strength between a bare cell and a case, thereby increasing reliability and quality.

According to an aspect of the present invention, there is provided a battery pack that includes a bare cell, a circuit module electrically connected to the bare cell, a frame case surrounding the bare cell and including a channel groove arranged at a region facing the bare cell, a coupling reinforcement portion arranged in the channel groove to couple the frame case to the bare cell and metal label attached to side surface of the bare cell.

The coupling reinforcement portion can include a bonding material. The coupling reinforcement portion can include a bonding material selected from a group consisting of urethane and modified silicone. The coupling reinforcement portion can include a bonding material exhibiting a shrinkage rate of 20% or less upon a curing process. The coupling reinforcement portion can include a bonding material that includes a ceramic. An amount of the ceramic can be in a range of 20 wt % to 80 wt % based on the total weight of the bonding material. The coupling reinforcement portion can include one of $Al(OH)_3$, $Al_2O_3$, $SiO_2$, $TiO_2$, $ZrO_2$, $ZnO_2$, $Si_3N_4$ and boron nitride (BN). The coupling reinforcement portion can be in is contact with the bare cell and the frame case. The channel groove can be arranged such that the frame case is opened toward the bare cell. The channel groove can be arranged to extend a length corresponding to an entire longitudinal length of the circuit module. The channel groove can be arranged to extend a length corresponding to an entire longitudinal length of the circuit module. The channel groove can include at least two channel grooves arranged at both sides of the circuit module in the longitudinal direction of the circuit module. The channel groove can include a single channel groove arranged only at a central region of the circuit module in a longitudinal direction of the circuit module. The channel groove can include a single elongated channel groove arranged in a longitudinal direction of the circuit module. The bare cell can be a pouch-type bare cell. The metal label may include a metal layer that includes at least one of Al, Cu, Fe and SUS (Stainless Use Steel). The metal label may also include an adhesive layer, an Al alloy layer arranged on the adhesive layer, a polyethylene terephthalate (PET) laminated film arranged on the Al alloy layer, and the metal layer formed on the PET laminated film.

According to another aspect of the present invention, there is provided a battery pack that includes a circuit module, a bare cell electrically connected to the circuit module and including a top surface on which the circuit module is arranged, a pair of narrow side surfaces and a pair of wide side surfaces extending from the top surface, and a bottom surface opposed to the top surface and connected to the narrow and wide side surfaces, a frame case including a plurality of plane portions, a plurality of extension portions and a channel groove, the plane portions covering the top surface, the pair of narrow side surfaces and the bottom surface of the bare cell, the extension portions extending from ends of the plane portions and over portions of the wide side surfaces of the bare cell, the channel groove being arranged in one of the extension portions, a coupling reinforcement portion arranged in the channel groove to couple the frame case to the bare cell and a metal label attached to side surfaces of the bare cell. The coupling reinforcement portion can include a bonding material. The coupling reinforcement portion can contact a top surface of the bare cell and an inner surface of the plane portion of the frame case that faces the top surface of the bare cell. The channel groove can be arranged in ones of the extension portions extending from a one of the plane portions that covers the top surface of the bare cell. The metal label may include a metal layer that comprises at least one of the Al, Cu, Fe and SUS (Stainless Use Steel). The metal label also comprises an adhesive layer, an Al alloy layer formed on the adhesive layer, a PET laminated film formed on the Al alloy layer, the metal layer being formed on the PET laminated film.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, embodiments of the present invention will be described in detail with reference to the accompanying drawings.

Figure 1A:
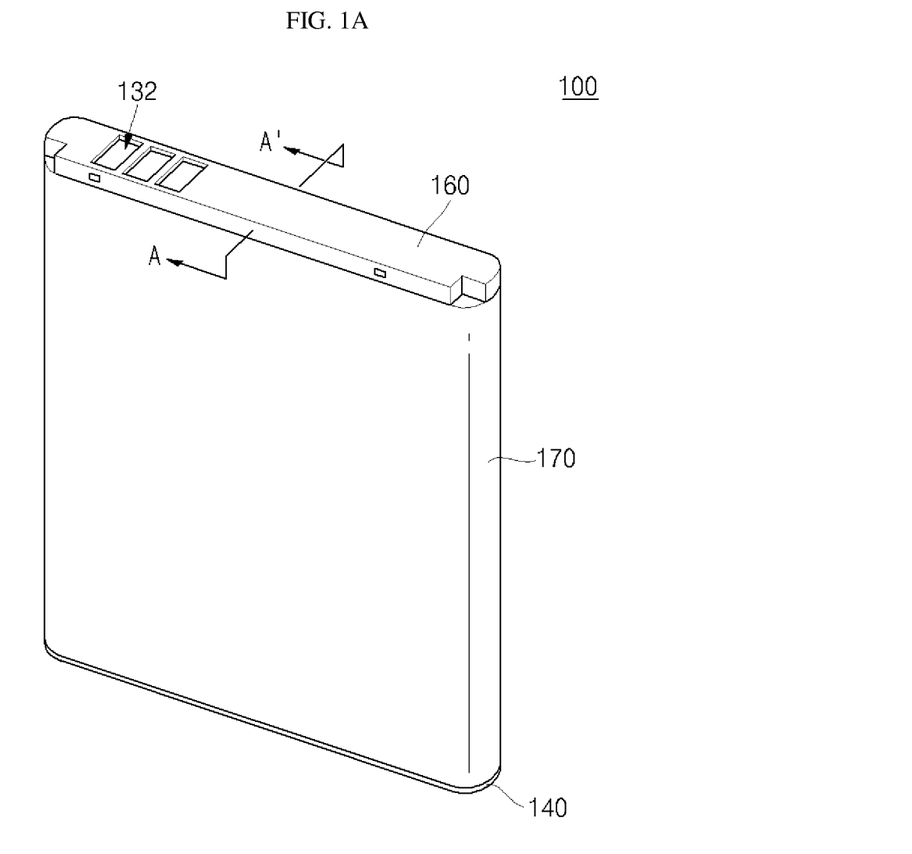
FIG. 1A is a perspective view of a battery pack according to a first embodiment of the present invention.
Figure 1B:
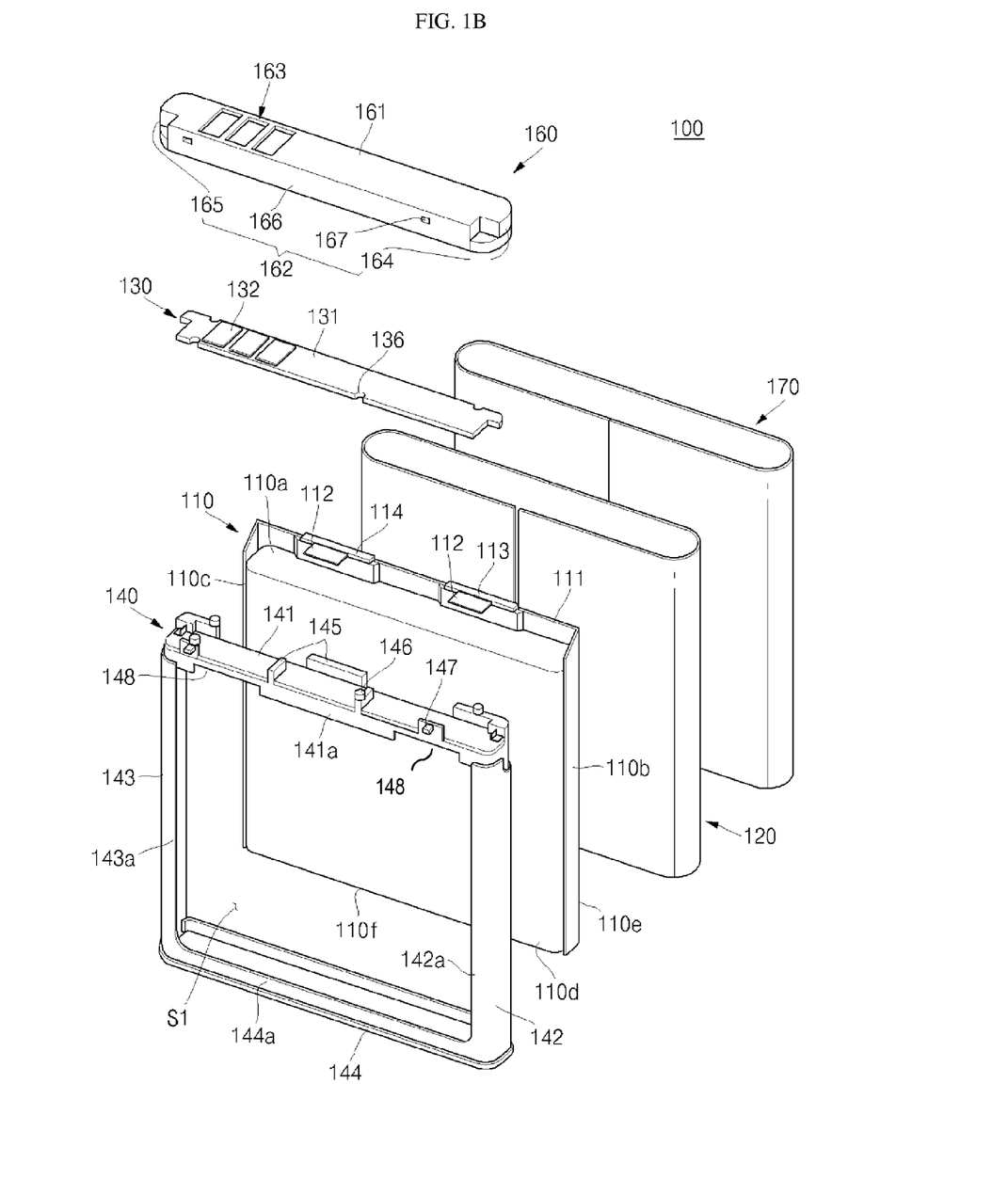
FIG. 1B is an exploded perspective view of the battery pack of FIG. 1A with a coupling reinforcement portion cut away.
Figure 1C:
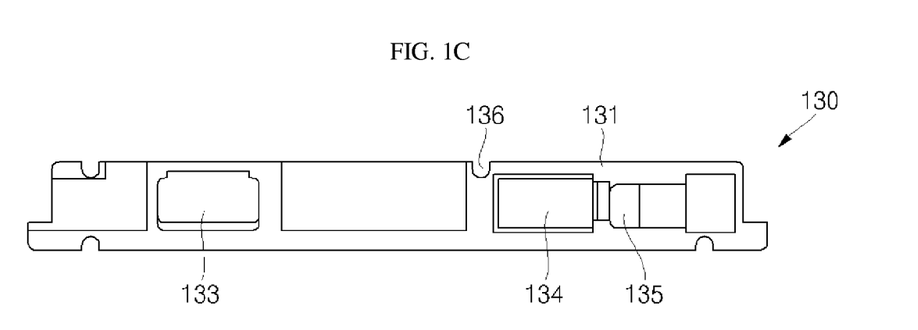
FIG. 1C is a perspective view illustrating a lower portion of a circuit module of the battery pack shown in FIG. 1B.
Figure 1D:
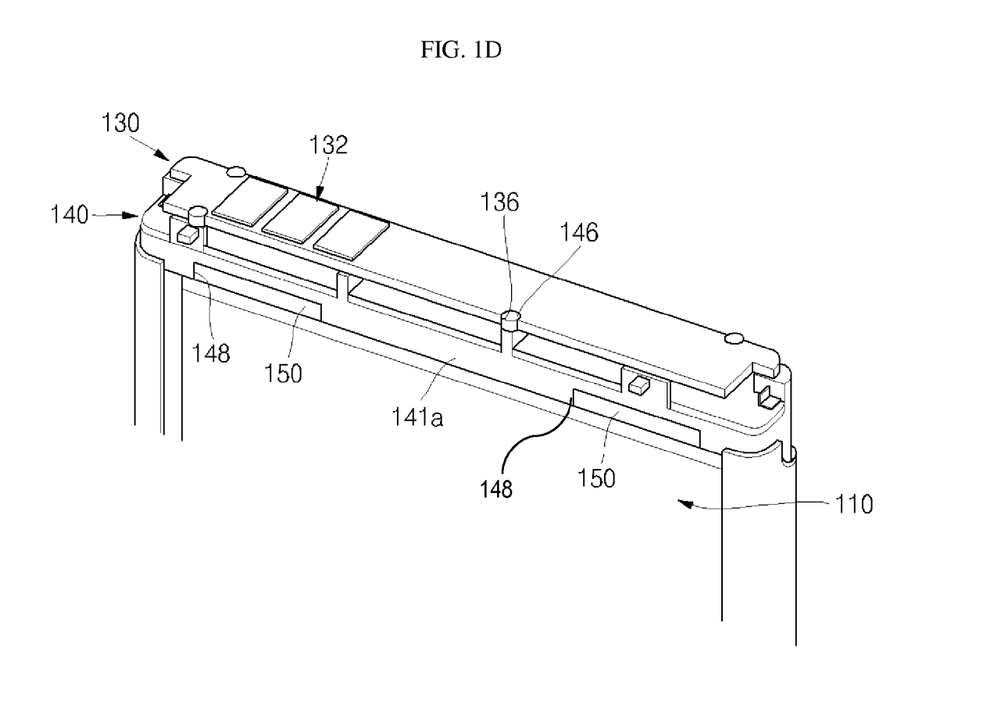
FIG. 1D is a perspective view illustrating the battery pack with a coupling reinforcement portion provided between each of a bare cell, a circuit module and a frame case shown in FIG. 1B.
Figure 1E:
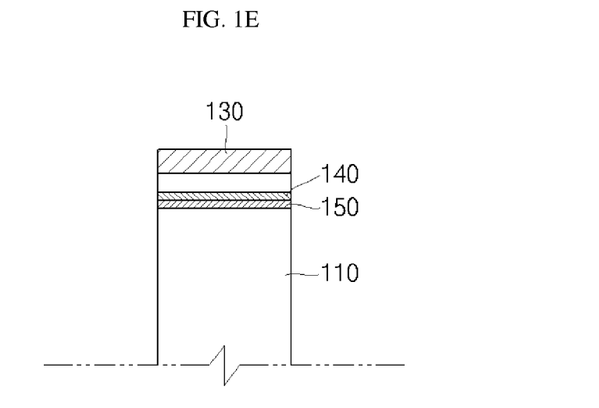
FIG. 1E is a sectional view of the battery pack taken along the line A-A' of FIG. 1A.

FIG. 1A is a perspective view of a battery pack according to a first embodiment of the present invention, FIG. 1B is an exploded perspective view of the battery pack of FIG. 1A with a coupling reinforcement portion cut away, FIG. 1C is a perspective view illustrating a lower portion of a circuit module of the battery pack shown in FIG. 1B, FIG. 1D is a perspective view illustrating the battery pack with a coupling reinforcement portion provided between each of a bare cell, a circuit module and a frame case shown in FIG. 1B and FIG. 1E is a sectional view of the battery pack taken along the line A-A' of FIG. 1A.

Referring to FIGS. 1A to 1E, the battery pack 100 according to the first embodiment of the present invention includes a bare cell 110, a sheath 120, a circuit module 130, a frame case 140, a coupling reinforcement portion 150, a top cover 160, and a metal label 170.

The bare cell 110, which is the source of electrical energy, is generally divided into a can type and a pouch type according to the material of a case enclosing an electrode assembly. In the following description, the battery pack 100 according to the first embodiment of the present invention will be described with regard to a pouch-type bare cell by way of example.

The bare cell 110 can include an electrode assembly (not shown) including a positive electrode, a negative electrode and a separator disposed between the positive electrode and the negative electrode, electrode tabs 112 and 113 connected to the positive electrode and the negative electrode, respectively, and a pouch case 111 that receives the electrode assembly while exposing the electrode tabs 112 and 113 to the outside. Here, insulating tapes 114, for preventing the electrode tabs 112 and 113 from electrically short-circuiting with the pouch case 111, can further be disposed at portions of the electrode tabs 112 and 113 where the electrode tabs 112 and 113 contact an end of the pouch case 111.

As shown in FIG. 1B, the bare cell 110 can have a top surface 110a on which the circuit module 130 is disposed, a pair of narrow side surfaces 110b and 110c and a pair of wide side surfaces 110d and 110e which are connected to the top surface 110a, and a bottom surface 110f facing the top surface 110a and connected to the side surfaces 110b, 110c, 110d, and 110e to form an outer appearance of the bare cell 110. Here, the pair of narrow side surfaces 110b and 110c denotes side surfaces having a relatively narrow width among the to side surfaces 110b, 110c, 110d, and 110e connected to the top surface 110a of the bare cell 110. The pair of wide side surfaces 110d and 110e denotes side surfaces having a relatively wide width among the side surfaces 110b, 110c, 110d, and 110e of the bare cell 110.

The sheath 120 surrounds the bare cell 110 to reinforce a mechanical strength of the pouch case 111 that would otherwise be vulnerable to external impact. To this end, the sheath 120 can be made out of a metallic material such as aluminum (Al). Here, a surface of the sheath 120 can be subjected to an insulation treatment in order to prevent an electrical short.

The circuit module 130 is disposed on the top surface 110a of the bare cell 110 and is electrically connected to the bare cell 110 to control the charging and discharging of the bare cell 110. The circuit module 130 electrically connects to the bare cell 110 through the electrode tabs 112 and 113 to form a core pack. The circuit module 130 can include a circuit board 131, an external terminal 132, connection terminals 133 and 134, a positive temperature coefficient (PTC) device 135, and a coupling groove 136.

The circuit board 131 can have a plate made out of resin. The circuit board 131 can include a circuit (not shown) for controlling the charging and discharging of the bare cell 110 and/or a protective circuit for preventing the bare cell 110 from being overdischarged and overcharged. The circuit board 131 can include a circuit device (device) configured to realize a charge/discharge circuit (not shown) and the protective circuit (not shown) on its bottom surface.

The external terminal 132 can be disposed on a top surface of the circuit board 131 to electrically connect the circuit board 131 to an external electric device (not shown). The connection terminals 133 and 134 can be disposed on the bottom surface of the circuit board 131 and be electrically connected to the electrode tabs 112 and 113 of the bare cell 110 by welding. Here, the connection terminal 133 and the electrode tab 112 can be electrically connected to a positive interconnection pattern (not shown) of the circuit module 130, and the connection terminal 134 and the electrode tab 113 can be electrically connected to a negative interconnection pattern (not shown) of the circuit module 130.

The PTC device 135 can be electrically connected to one of the connection terminals 133 and 134 to interrupt a flow of current when overcurrent or overvoltage flows into the battery pack 100, thereby preventing the battery pack 100 from exploding due to overheating. The coupling groove 136 is formed along the outer circumference of one long edge of the circuit board 131 and serves as a coupling member for physically coupling the to circuit module 130 and the frame case 140 to each other.

The frame case 140 is formed between the bare cell 110 and the circuit module 130 and surrounds the bare cell 110 and is physically coupled to the circuit module 130. The frame case 140 is frame-shaped and covers the top surface 110a, the bottom surface 110f and the pair of narrow side surfaces 110b and 110c, exposes to the outside the pair of wide side surfaces 110d and 110e of the bare cell 110 while covering side edges of the pair of wide side surfaces 110d and 110e. With this configuration, a space S1 for accommodating the bare cell 110 is provided within the frame case 140.

In detail, the frame case 140 includes plane portions 141, 142, 143 and 144 and extension portions 141a, 142a, 143a and 144a. The plane portions 141, 142, 143 and 144 covers the top surface 110a, the pair of narrow side surfaces 110b and 110c and the bottom surface 110f respectively of the bare cell 110. The extension portions 141a, 142a, 143a and 144a extend from edges of the plane portions 141, 142, 143 and 144 that are parallel to the edges of the pair of wide side surfaces 110d and 110e of the bare cell 110 and extend toward a center of ones of the pair of wide side surfaces 110d and 110e of the bare cell 110 so as to cover portions of ones of the pair of wide side surfaces 110d and 110e of the bare cell 110.

In addition, the frame case 140 can include a supporting portion 145, a coupling protrusion 146, a rib 147, and a channel groove 148 formed at the plane portion 141.

The supporting portion 145 protrudes from peripheral and central areas of the plane portion 141 toward the circuit module 130. The supporting portion 145 supports the circuit module 130 when the circuit module 130 is disposed on the plane portion 141, and provides a space for accommodating the electrode tabs 112 and 113, the connection terminals 133 and 134 and the PTC device 135 arranged between the plane portion 141 and the circuit module 130.

The coupling protrusion 146 protrudes from the supporting portion 145, is located to correspond to the coupling groove 136 of the circuit module 130 and points inwards toward the circuit module 130. The coupling protrusion 146 is fitted into the coupling groove 136 and serves as a coupling member for physically coupling the circuit module 130 and the frame case 140 to each other.

The rib 147 protrudes from lateral surfaces of the supporting portion 145. The rib 147 is fitted into a rib coupling hole 167 of a top cover 160, which will later be described, and serves as a coupling member for physically coupling the frame case 140 and the top to cover 160 to each other.

The channel groove 148 is formed as a cut-out of extension portion 141a and is on a side of plane portion 141 that faces the bare cell 110. In addition, the channel groove 148 is formed to extend from one surface of the frame case 140 facing the bare cell 110 to the other surface opposite to the one surface of the frame case 140. In detail, the channel groove 148 is formed at a region of the frame case 140, at which the top surface 110a of the bare cell 110 is wrapped. In other words, as shown in FIG. 1D, the channel groove 148 is formed by penetrating extension portions 141a bent and extended from the plane portion 141 covering the top surface 110a of the bare cell 110.

The channel groove 148 provides for a path through which a bonding material can be inserted between top surface 110a of bare cell 110 and plane portion 141 of frame case 140 to form a coupling reinforcement portion 150. Here, the channel groove 148 can include at least two channel grooves formed at both sides of the circuit module 130 in the longitudinal direction of the circuit module 130.

The frame case 140 having the aforementioned configuration can be integrally formed by an injection molding technique using a resin such as polycarbonate (PC), polyethylene terephthalate glycol (PETG), polyethylene (PE), polypropylene (PP), and acrylonitrile butadiene styrene (ABS).

Referring to FIG. 1D, the coupling reinforcement portion 150 is formed in the channel groove 148 by injecting the bonding material into a gap between the bare cell 110 and the frame case 140 through the channel groove 148 and curing the same. Referring to FIG. 1E, the coupling reinforcement portion 150 contacts the bare cell 110 and the frame case 140 and fills a gap between the bare cell 110 and the frame case 140, the gap generated when they are coupled to each other, thereby improving a coupling strength between the bare cell 110 and the frame case 140. To this end, the coupling reinforcement portion 150 can be made out of a bonding material having adhesiveness, such as a bonding material that includes urethane or modified silicone.

When an external impact is applied to the top cover 160, the top cover 160, the circuit module 130 and the frame case 140 can be pressurized. In this regard, to prevent the bare cell 110 from being damaged due to external impact, the coupling reinforcement portion 150 disposed on the bare cell 110 can serve as a buffer. To this end, the coupling reinforcement portion 150 can be made out of a bonding material exhibiting a shrinkage rate of 20% or less during a curing process. When the shrinkage rate of the bonding material exceeds 20%, suggesting that the external terminal 132 is weak against an external impact, the external terminal 132 can collapse toward the bare cell 110. Thus, contact failures between the external terminal 132 and an external device are likely to occur.

When the shrinkage rate of the bonding material is less than or equal to 20%, a is bonding material containing ceramic can be used. Examples of the ceramic for the bonding material include $Al(OH)_3$, $Al_2O_3$, $SiO_2$, $TiO_2$, $ZrO_2$, $ZnO_2$, $Si_3N_4$ and boron nitride (BN). Here, an amount of the ceramic can be in range of 20 wt % to 80 wt % based on the total weight of the bonding material. If the amount of the ceramic is less than 20 wt % based on the total weight of the bonding material, the shrinkage reducing effect during the curing of the bonding material is negligible. If the amount of the ceramic is greater than 80 wt % based on the total weight of the bonding material, the adhesiveness of the bonding material can be undesirably lowered.

Table 1 shows experimental data for shrinkage of resin containing 50 wt % of ceramic, for example, $Al(OH)_3$, based on the total weight of resin.

TABLE 1

| Bonding material of Coupling reinforcement Portion | Dwell Temperature (° C.) | Dwell Time | Shrinkage Rate (%) |
|---|---|---|---|
| Resin containing 50 wt % of $Al(OH)_3$ | 20 | 7 days | 12 |
| | 50 | 1 day | 13.7 |
| | 105 | 3 hours | 13.7 |
| | 120 | 3 days | 14.8 |

As confirmed from Table 1, in consideration of temperature and dwell time, for resin containing 50 wt % of $Al(OH)_3$, the shrinkage rate of 20% or less during the dwelling process is achieved for a variety of dwell times/dwell temperature combinations. As a result, resin containing 50 wt % of $Al(OH)_3$ is a preferred bonding material to form the coupling reinforcement portion 150.

The top cover 160 is coupled to an upper portion of the bare cell 110 and receives the circuit module 130 in its inner space. The top cover 160 can include a cover plate 161 and a sidewall 162 extending from the cover plate 161 and towards the circuit module 130.

The cover plate 161 can be shaped in substantially the same manner as the circuit to board 131. An inner surface of the cover plate 161 comes into contact with the top surface of the circuit board 131. The cover plate 161 includes a through hole 163 formed at a region corresponding to the external terminal 132. The through hole 163 allows the external terminal 132 to be exposed to the outside, thereby allowing the battery pack 100 to connect to an external electric device (not shown).

The sidewall 162 includes first and second ends 164 and 165 positioned at opposite ends of the top cover 160 in a longitudinal direction of the top cover 160, and a connection portion 166 connecting the first and second ends 164 and 165 to each other. Here, portions of the first and second ends 164 and 165 and the connection portion 166 are covered by a metal label 170, which will later be described.

In addition, the sidewall 162 can include a rib coupling hole 167 protruding from a region of the connection portion 166 at a location that corresponds to the rib 147 of the frame case 140. The rib coupling hole 167 into which the rib 147 of the frame case 140 is inserted can serve as a coupling member for physically coupling the frame case 140 and the top cover 160 to each other.

Figure 1F:
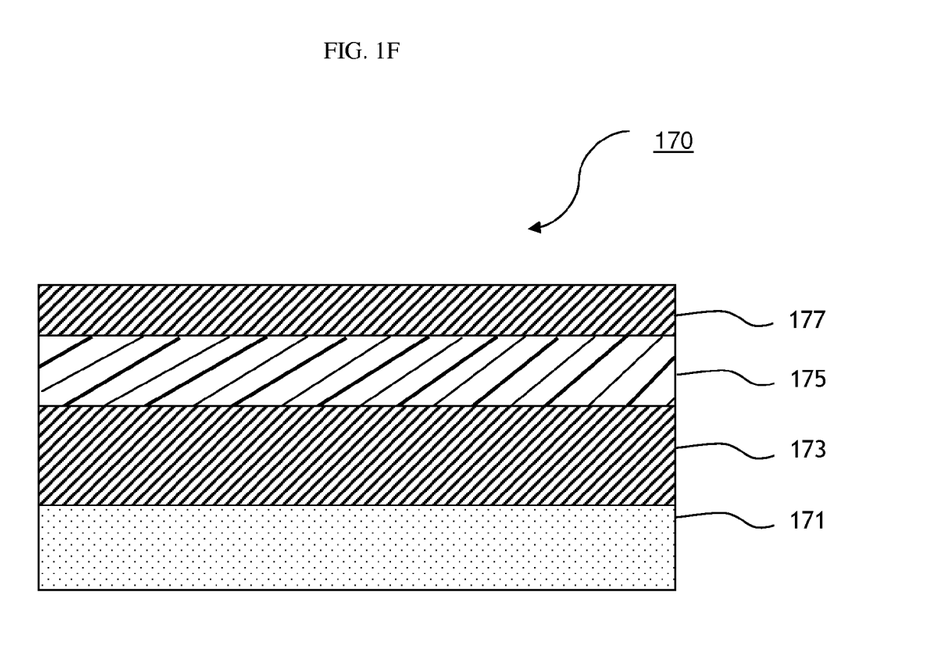
FIG. 1F is a cross sectional view of the metal label of the battery pack of FIG. 1A.

The metal label 170 is attached to the side surfaces 110b, 110c, 110d, and 110e of the bare cell 110. The metal label 170 covers portions of the first and second ends 164 and 165 and a portion of the connection portion 166 of the top cover 160. The metal label 170 functions to increase the coupling strength between each of the bare cell 110, the frame case 140 and the top cover 160. The metal label 170 may be a laminate including a plurality of layers that includes at least one metallic layer. As illustrated in FIG. 1F, the metal label 170 may include an adhesive layer 171, an Al alloy layer 173 arranged on the adhesive layer 171, a polyethylene terephthalate (PET) laminated film 175 arranged on the Al alloy layer 173, and a metal layer 177 arranged on the PET laminated film 175. Here, the adhesive layer 171 serves to attach the metal label 170 to the bare cell 110, and can be arranged at on external surface of the metal label 170. The adhesive layer 171 may have a thickness of 25 nm, the Al alloy layer 173 may have a thickness of 50 nm, the PET laminated film 175 may have a thickness of 25 nm and the metal layer 177 may include at least one of Al, Cu, Fe and SUS (Stainless Use Steel) and may have a thickness of 0.1 nm. Since the metal label 170 includes metallic materials and has the adhesive layer 171, an adhesive property of the metal label 170 can be further reinforced and a coupling strength between the bare cell 110, the frame case 140 and the top cover 160 can be enhanced.

As described above, the battery pack 100 according to the first embodiment can include the frame case 140 having the channel groove 148, and the coupling reinforcement portion 150 formed by injecting a bonding material through the channel groove and into a gap between the bare cell 110 and the frame case 140, thereby improving the coupling is strength between the bare cell 110 and the frame case 140. Thus, the battery pack 100 according to the first embodiment can have improved durability against an external impact such as bending or twisting to increase reliability and quality.

Hereinafter, a battery pack according to a second embodiment will be described. The battery pack 200 according to the second embodiment of FIG. 2 has substantially the same configuration and operation as the battery pack 100 according to the first embodiment shown in FIG. 1D, except for a position where a channel groove 248 is formed on a frame case 240. Thus, the battery pack according to the second embodiment will be described in detail with emphasis placed on the frame case 240.

Figure 2:
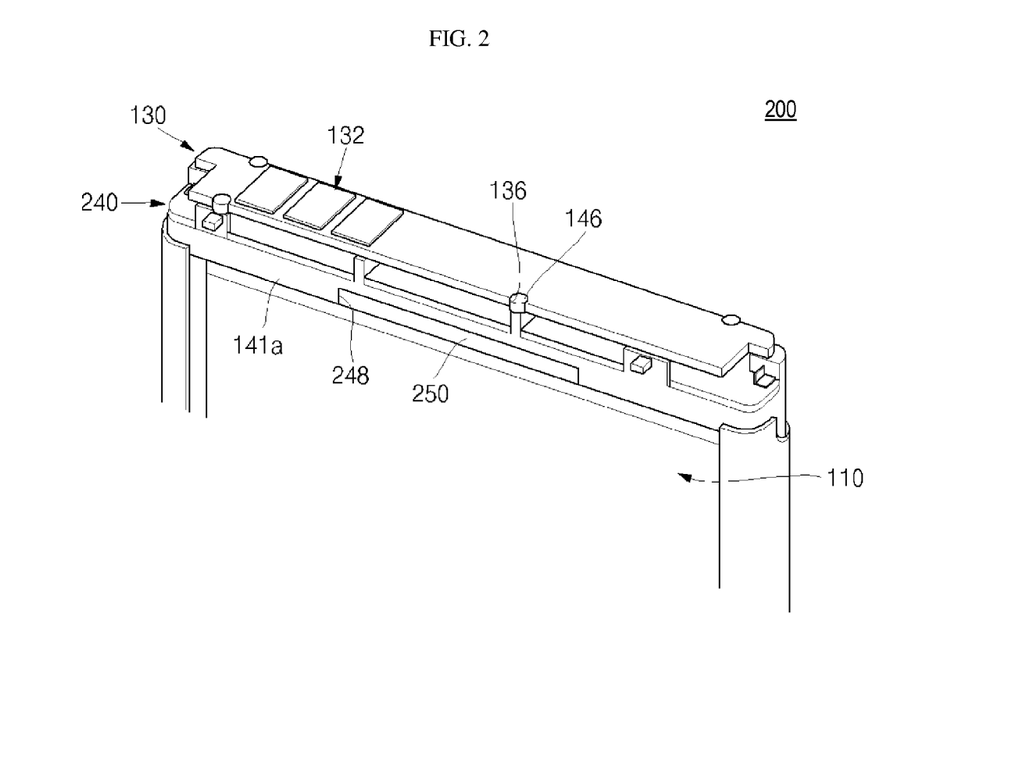
FIG. 2 is a perspective view of a battery pack according to a second embodiment of the present invention, illustrating a state in which a component corresponding to a portion shown in FIG. 1D is assembled.

Referring to FIG. 2, the frame case 240 has substantially the same shape as the frame case 140 shown in FIG. 1D, except that a single channel groove 248 is formed at a central portion of extension portion 141a in a longitudinal direction of the circuit module 130. A coupling reinforcement portion 250 is formed by injecting the bonding material into a gap between the bare cell 110 and the frame case 240 through the channel groove 248 and curing the same. Here, since the bonding material is injected through only the single channel groove 248 formed at the central region of the extension portion 141a of the frame case 240, the injecting of the bonding material can be easily controlled. Accordingly, the coupling reinforcement portion 250 can be produced using the minimum amount of bonding material required to increase the coupling strength between the bare cell 110 and the frame case 240.

As described above, the battery pack according to the second embodiment of the present invention includes the frame case 240 having the single channel groove 248 longitudinally formed at the central region of the circuit module 130. Thus, the amount of the bonding material used to form the coupling reinforcement portion 250 can be minimized, thereby reducing the manufacturing cost of the battery pack according to the second embodiment of the present invention.

Hereinafter, a battery pack 300 according to a third embodiment will be described in conjunction with FIG. 3. The battery pack according to the third embodiment has to substantially the same configuration and operation as the battery pack 100 according to the first embodiment shown in FIG. 1D, except for the specifics regarding channel groove 348 formed in frame case 340. Thus, the battery pack 300 according to the third embodiment will be described in detail with emphasis placed on the frame case 340.

Figure 3:
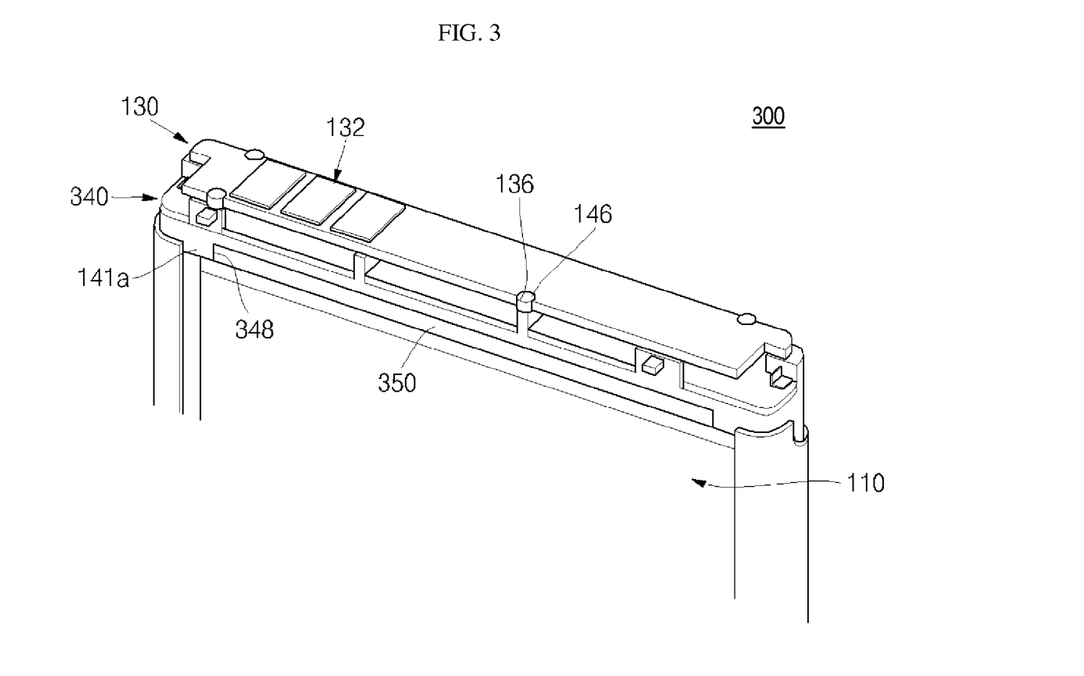
FIG. 3 is a perspective view of a battery pack according to a third embodiment of the present invention, illustrating a state in which a component corresponding to a portion shown in FIG. 1D is assembled.

Referring to FIG. 3, the frame case 340 has substantially the same configuration as is the frame case 140 shown in FIG. 1D, except that a single elongated channel groove 348 is formed along an entire portion of the extension portion 141a of frame case 340 in a longitudinal direction of the circuit module 130. A coupling reinforcement portion 350 is formed by injecting the bonding material into a gap between the bare cell 110 and the frame case 340 through the channel groove 348 and curing the same. Here, since the bonding material is injected through only the channel groove 348 formed as a single body along the entire length of the extension portion 141a of the frame case 340, the coupling reinforcement portion 350 is formed over a wide area between the bare cell 110 and the frame case 340.

As described above, the battery pack according to the third embodiment of the present invention includes the frame case 340 having the elongated channel groove 348 formed in the longitudinal direction of the circuit module 130. Thus, the bonding material used to form the coupling reinforcement portion 350 can be evenly injected into a gap between the bare cell 110 and the frame case 340 with increased efficiency. Accordingly, in the battery pack according to the third embodiment of the present invention, the coupling strength between the bare cell 110 and the frame case 340 is increased, thereby further increasing reliability in quality.

Although exemplary embodiments of the present invention have been described in detail hereinabove, it should be understood that many variations and modifications of the basic inventive concept herein described, which can appear to those skilled in the art, will still fall within the spirit and scope of the exemplary embodiments of the present invention as defined by the appended claims and their equivalents.

What is claimed is:

1. A battery pack, comprising:
   a bare cell;
   a circuit module electrically connected to the bare cell;
   a frame case surrounding the bare cell and including a channel groove arranged at a region facing the bare cell;
   a coupling reinforcement portion arranged in the channel groove to couple the frame case to the bare cell; and
   a metal label attached to side surfaces of the bare cell, wherein the metal label comprises:
     an adhesive layer;
     an Al alloy layer arranged on the adhesive layer;
     a polyethylene terephthalate (PET) laminated film arranged on the Al alloy layer; and
     a metal layer arranged on the PET laminated film.

2. The battery pack of claim 1, wherein the Al alloy layer has a thickness of 50 μm.

3. The battery pack of claim 1, wherein the adhesive layer has a thickness of 25 μm.

4. The battery pack of claim 1, wherein the coupling reinforcement portion is comprised of a bonding material exhibiting a shrinkage rate of 20% or less upon a curing process.

5. The battery pack of claim 1, wherein the coupling reinforcement portion is comprised of a bonding material that includes a ceramic.

6. The battery pack of claim 5, wherein an amount of the ceramic is in a range of 20 wt % to 80 wt % based on the total weight of the bonding material.

7. The battery pack of claim 1, wherein the coupling reinforcement portion is comprised of at least one material selected from a group consisting of $Al(OH)_3$, $Al_2O_3$, $SiO_2$, $TiO_2$, $ZrO_2$, $ZnO_2$, $Si_3N_4$ and boron nitride (BN).

8. The battery pack of claim 1, wherein the PET laminated film has a thickness of 25 μm.

9. The battery pack of claim 1, wherein the metal layer has a thickness of 0.1 μm.

10. The battery pack of claim 1, wherein the channel groove is formed to extend through from one surface of the frame case to the other surface opposed to the one surface of the frame case.

11. The battery pack of claim 1, wherein the channel groove is formed at a region of the frame case where the top surface of the bare cell, on which the circuit module is disposed, is wrapped by the metal label.

12. The battery pack of claim 1, wherein the channel groove comprises at least two channel grooves arranged at both sides of the circuit module in the longitudinal direction of the circuit module.

13. The battery pack of claim 11, wherein the channel groove comprises a single channel groove arranged at a central region of the circuit module in a longitudinal direction of the circuit module.

14. The battery pack of claim 1, wherein the channel groove comprises a single elongated channel groove arranged in a longitudinal direction of the circuit module.

15. The battery pack of claim 1, wherein the bare cell is a pouch-type bare cell.

16. The battery pack of claim 1, wherein the metal layer comprises at least one material selected from a group consisting of Al, Cu, Fe and SUS.

17. A battery pack, comprising:
a circuit module;
a bare cell electrically connected to the circuit module and including a top surface at an upper portion thereof on which the circuit module is arranged, a pair of narrow side surfaces and a pair of wide side surfaces extending from the top surface, and a bottom surface opposed to the top surface and connected to the narrow and wide side surfaces;
a top cover coupled to an upper portion of the bare cell and receiving the circuit module;
a frame case including a plurality of plane portions, a plurality of extension portions and a channel groove, the plane portions covering the top surface, the pair of narrow side surfaces and the bottom surface of the bare cell, the extension portions extending from ends of the plane portions and over portions of the wide side surfaces of the bare cell, the channel groove being arranged in at least one of the extension portions;
a coupling reinforcement portion arranged in the channel groove to couple the frame case to the bare cell; and
a metal label attached to side surfaces of the bare cell and side surfaces of the top cover to increase a coupling strength between each of the bare cell, the frame case and the top cover.

18. The battery pack of claim 17, wherein the metal label leaving the plane portion of the frame case corresponding to the bottom surface of the bare cell exposed.

19. The battery pack of claim 17, wherein the metal label covers each of the wide side surfaces and the narrow side surfaces of the bare cell.

20. The battery pack of claim 17, wherein the channel groove is arranged in ones of the extension portions extending from a one of the plane portions that covers the top surface of the bare cell.

21. The battery pack of claim 17, wherein the metal label covers the plane portions of the frame case that cover the narrow side surfaces of the bare cell.

22. The battery pack of claim 17, wherein the metal label comprises:
an adhesive layer;
an Al alloy layer arranged on the adhesive layer;
a PET laminated film arranged on the Al alloy layer; and
a metal layer arranged on the polyethylene terephthalate (PET) laminated film, wherein the metal layer comprises at least one material selected from a group consisting of Al, Cu, Fe and SUS.

23. The battery pack of claim 17, the metal label being adhered to and being wrapped around each of the plane portions of the frame case that cover the narrow side surfaces of the bare cell as well as the wide side surfaces of the bare cell while exposing the plane portion of the frame case that covers the bottom surface of the bare cell.

* * * * *